UNITED STATES PATENT OFFICE.

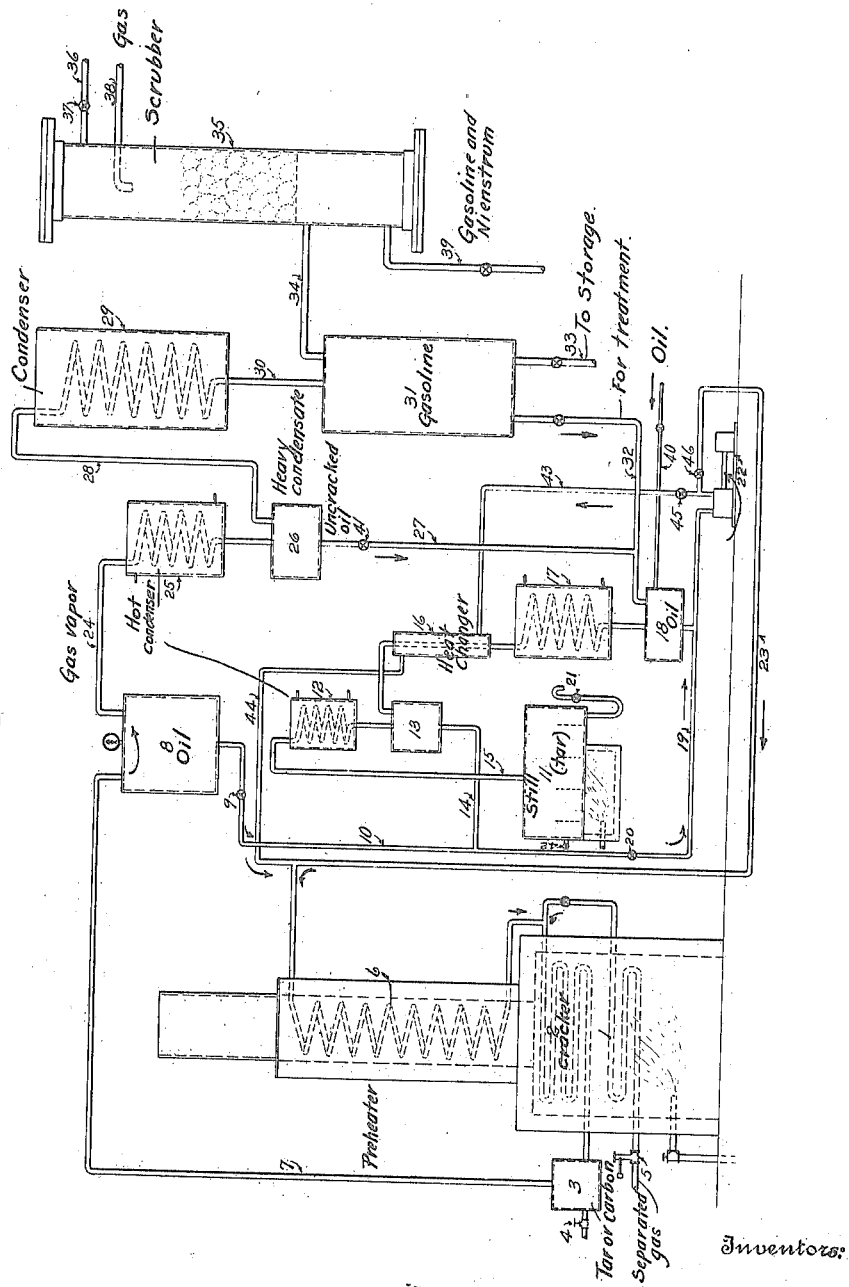

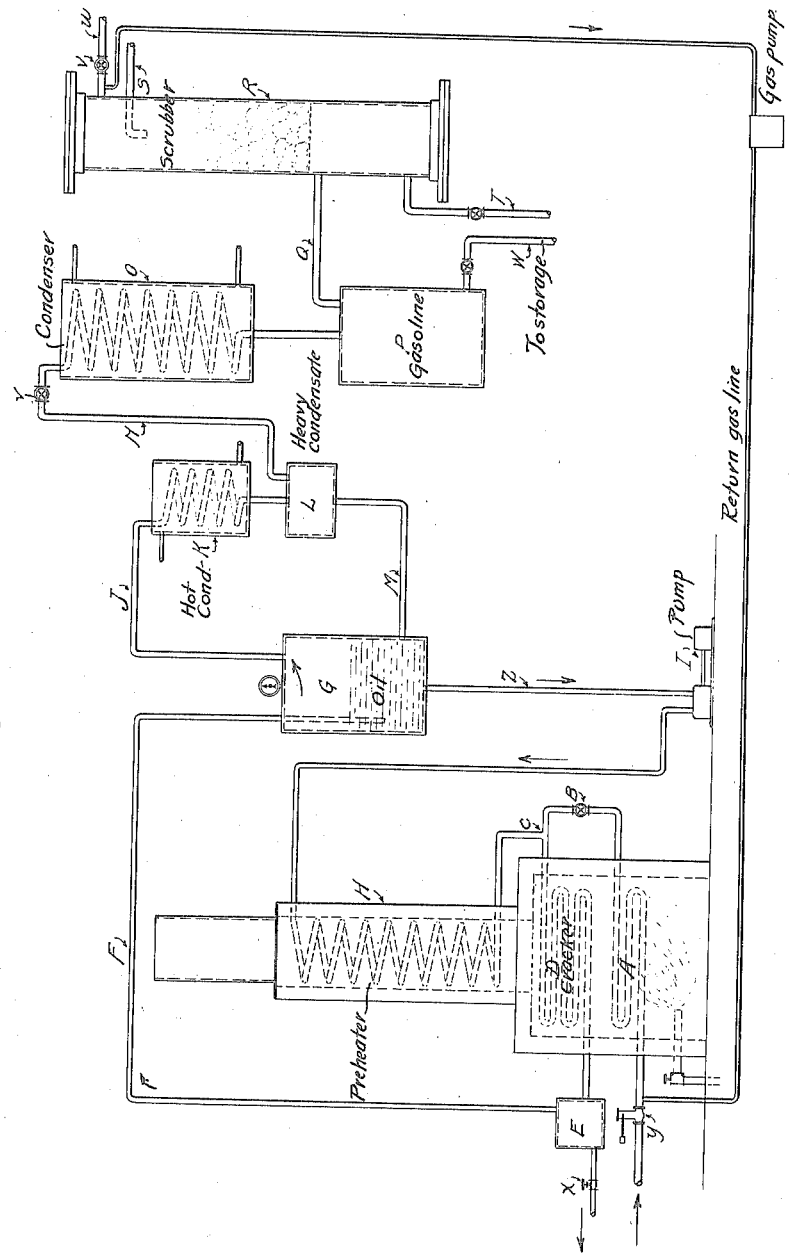

PASCAL McDONALD BIDDISON, OF COLUMBUS, AND HUGH T. BOYD, OF HOMER, OHIO.

PROCESS OF DISTILLING PETROLEUM.

1,345,740.     Specification of Letters Patent.     Patented July 6, 1920.

Application filed February 15, 1918. Serial No. 217,440.

*To all whom it may concern:*

Be it known that we, PASCAL MCDONALD BIDDISON and HUGH T. BOYD, of Columbus and Homer, Ohio, respectively, have invented certain new and useful Improvements in Processes of Distilling Petroleum, of which the following is a specification.

Our invention has to do with an improvement in the distillation or treatment of petroleum particularly for obtaining therefrom low-boiling point hydrocarbons from higher boiling point hydrocarbons.

In the art of distilling residue of petroleum distillation such as gas oil or fuel oil at atmospheric pressure, vaporization begins at upward of 450° F. and all will distil over at temperature upward of 650° F. In disstilling this residue under a pressure upward of 3 atmospheres, a range of temperature of about 650°–850° F. is produced.

There are many objectionable features in the present processes of distilling petroleum residues for the production of low-boiling-point hydrocarbons; first, the danger of the still bottom burning out under the excessive heat required on the outside of the oil containing wall in order to attain a "cracking" temperature on the oil within and the subsequent discharge of a large volume of oil into the furnace, second, the difficulty of maintaining a constant temperature due to carbon depositing on the walls of the still and insulating them, third, the difficulty of maintaining a constant pressure on the system, fourth, the difficulty of maintaining a constant rate of distillation, fifth, the difficulty of removing carbon continuously from the system, sixth, the low percentage of high boiling hydrocarbons converted to low boiling point hydrocarbons.

The object of our process is to provide a method whereby these difficulties are reduced to a minimum in the distillation of petroleum residue for the production of low-boiling-point hydrocarbons. This is secured in our process by, first, the fact that excessive heat is not required on the walls of the still which is attained by keeping the temperature of the superheated gas high enough so that it, in connection with the lower heat on the oil-container walls, causes most of the decomposition to the lower-boiling-point hydrocarbons; second, the maintenance of a steady temperature control by regulation of the flow of gas through the superheater; third, the maintennance of very constant pressure by a regulating pressure valve on the gas inlet or outlet; fourth, the continuous removal of carbon by distillation from the cracked oil by means of intermediate stills so arranged that they can be used intermittently for removal of carbon and tar when it accumulates in quantity or can be used for the continuous removal of same, fifth, the maintenance of a steady rate of distillation by the gas flow.

By circulating oil at a fairly rapid rate, through the retort thus increasing the rate of heat transfer from the walls of the oil containing vessel we reduce the temperature required to be maintained on the walls of the oil containing vessel.

By agitation of the oil due to the rapid circulation and the injection of gas we prevent overheating of the molecules of the oil when they come in contact with the walls of the oil container.

It is admitted by numerous experimenters on oil-cracking processes that to produce gasolene containing only a low percentage of unsaturated hydrocarbons of the olefin series, that the low-boiling-point hydrocarbons must be removed from the reaction zone as soon as formed. We reduce the formation of unsaturated hydrocarbons of the olefin series by the removal of the low-boiling-point hydrocarbons from the liquid at the instant of formation by means of the injection of large amounts of superheated gas, which passing through the oil immediately saturates itself with the low-boiling hydrocarbons, removes them from the liquid and thus largely prevents the undue further cracking of these hydrocarbons to olefins.

We have found from our experimental work that the use of a gaseous medium as used in our method, involving the law of partial pressures, is of great value in reducing the percentage of un-saturated hydrocarbons of the olefin series. Without using the gaseous medium, our resulting gasolene contained almost double the percentage of olefin hydrocarbons. We attribute the difference in results to the low partial pressure of the oil vapors while in the process of decomposition at relatively high temperatures.

In our process only a portion of the oil in the cracking zone is in the vapor state. These vapors from the oil are mixed with the superheated gas that has been admitted into the cracking zone. The pressure of these oil vapors then depends upon the proportion they form of the total vapors present according to the physical law of partial pressures of mixed gases and vapors. If the pressure in the cracking zone is 100 pounds absolute, and the oil vapors constitute one per cent. of the total vapors present, then the pressure of the oil vapors is one per cent. of 100 pounds or one pound, and the pressure of any one constituent of the oil vapors depends in like manner upon its proportion of the whole amount of vapors present. Our experiments and study have convinced us that while heat is necessary to break up the heavy oil into compounds of lower specific gravity, that pressure on the cracking vapors aids the formation of unsaturated compounds and retards the breaking up of the heavy hydrocarbons. In the system which we outline in this application we can get the temperature required for breaking up the heavy compounds while still maintaining a low pressure of the oil vapors. This actually results in an increased yield of gasolene containing a very low per cent. of unsaturated hydrocarbons. At the same time this injected gas serves the very valuable purpose of removing from the liquid the gasolene as quickly as formed.

In our experiments we have used natural gas containing about 80% methane and 15% ethane by ordinary combustion analysis but we do not restrict ourselves to the use of this gas but intend to cover other gases, either natural gas of any composition, coal gas, water gas, hydrogen, nitrogen or any hydrocarbon gas or any other gas which will not produce combustion in the retort and which has the power of saturating itself with oil vapors, preferably a hydrocarbon gas in which substances belonging to the paraffin series predominate. For instance the gas generated in the cracking process can itself be compressed and re-circulated.

In the accompanying drawing, Figure 1, illustrates diagrammatically one form of apparatus comprising a so-called pressure still. Fig. 2, is a diagram showing the apparatus without intermediate tar stills.

At 8 and 18 are shown tanks containing the oil being treated. From near the bottom of the tank 8 an outlet line 10 leads to either continuous still 11, or to tank 18 by valve 20 and line 19. From tank 18 the fresh oil is circulated by pump 22 through line 23 to a preheating coil 6 where it is preheated before entering the "cracking" zone at 2. At a point outside of 2 superheated gas enters through regulator valve 5 and coil 1. The gas-oil mixture passes out of cracking zone 2 into a small receiver 3 where any accumulated carbon can be blown out by way of valve 4. From 3 the gas-oil mixture passes by line 7 back to storage tank 8. From tank 8 the gas saturated with light and heavy hydrocarbons passes to a hot condenser 25 where by proper temperature regulation all heavy or "uncracked" oil can be returned from 26 and outlet line 27 back through tank 18 to the circulating pump 22. From 26 the gas and light hydrocarbons pass by line 28 to cold condenser 29 where most of the light low-boiling-point hydrocarbons condense and pass by line 30 receiver 31. They can be drawn off here by line 33 and sent to gasolene storage tanks by line 33 or sent back into circulation if not of high enough gravity (Bé.) or in other words, of too high boiling point, in exceptional cases through line 32. From receiver 31 the gas passes by 34 to any suitable scrubber or absorber 35 where the gas is scrubbed of any remaining gasolene vapors by an absorbent menstruum entering at 38 and passing out at 39. Heavy oil may be used as the absorbent in 35. The denuded gas passes out of the system by valve 37 and line 36. Fresh oil can be fed into the cracking system by line 40. When, after considerable use the system accumulates some tarry matter, valve 20 may be closed and valve 42 opened. Then the oil from 8 passes to still 11. From 11 the distillate vapors pass by 15 to hot condenser 12 where any tarry matter carried mechanically by the vapors is knocked out into 13 and which tarry matter passes back to still 11 by line 14. The clean oil vapors pass through heat exchanger 16 to condenser 17 where they are liquefied and pass back into the system through receiver 18 and circulating pump 22 by either valve 46 and line 23 or valve 45 and line 43 and 44, in the latter case passing through heat exchanger 16.

Thus three systems of operation are available:

A system of operation where oil from tank 8 passes directly to pump 22 through line 10 valve 20 and pipe 19 thence back through line 23 to cracking zone, the oil in tank 8 gradually diminishing in volume due to the products passing off at line 24, while still 11 is used intermittently for the removal of tarry matter and carbon by closing valve 20 and allowing oil to pass through still 11 condenser 12, separator 13, exchanger 16, condenser 17, tank 18, pump 22, thence back to cracking zone through valve 45 line 43 exchanger 16 and pipe 44, valve 40 being closed and no fresh oil being admitted during this system of operation.

Or, the same system as above may be followed except that the oil level in tank 8 is maintained at practically a constant level by means of either continuous or intermittent admission of oil through line 40. The tank 8 is filled by closing valves 41, 20 and 9, and the valve in line 32 opening valve 40 and starting pump 22 with either valve 45 or 46 open, the oil in each case passing through coil 2 and pipe 7 into tank 8.

Or a system of operation may be followed where the oil level in tank 8 is maintained at practically a constant level by means of either continuous or intermittent admission of oil through line 40 and the still 11 is used continuously for the removal of tarry matter and carbon by passing the oil from tank 8 through valve 42 into still 11, thence through condenser 12, separator 13, exchanger 16, condenser 17, tank 18 and pump 22 thence back to cracking zone through pipe 43, exchanger 16 and pipe 44.

The following is a description of our process such as would enable any one skilled in the art to which it pertains, to use and apply the same.

Oil to be distilled is fed into the system through line 40 and pump 22 until a sufficient charge is accumulated in tank 8. Then with valves 37, 41, 42, and 9 closed, as well as the valves in pipes 32 and 33, the system is filled with gas through regulator 5 and coil 1. Heating of the furnace is started and oil is started in circulation by pump 22. The regulating valve 5 is set for the desired pressure and when the coil at 2 approaches the desired temperature and the superheated gas is considerably above the desired cracking temperature, distillation is started by partly opening the outlet valve 37 with absorbent oil circulating through absorber 35, the gas plus hydrocarbons pass from tank 8 through line 24 to hot condenser 25 where heavy hydrocarbons condense into receiver 26 and are let back into the system by valve 41 and line 27. The gas plus low-boiling hydrocarbons pass to a cold condenser 29 by means of line 28 where the most of the gasolene condenses and falls into receiver 31. The gas, still containing some light hydrocarbons, passes by line 34 to absorber 35 where it is denuded of its gasolene vapors by absorbent oil entering at 38 and passing out at 39, to a suitable distilling apparatus where the gasolene is distilled off from the absorbent oil, the absorbent oil cooled and returned to scrubber by line 38. The denuded gas passes out of system by line 36.

After the system has been in use for a considerable length of time, tarry matter accumulates to a slight extent, and this is removed as heretofore described.

Referring to Fig. 2, G is an oil storage tank with an outlet pipe line Z leading to force pump I which forces oil through heat exchanger coil in H down into still D, which serves as a cracking coil. At point C outside the pressure still D superheated gas enters from gas superheater A. The superheated gas plus oil mixture after passing through pressure still D comes out into small receiver E where any accumulated carbon can be occasionally blown out by the valve X. The gas oil mixture passes by line F to reservoir G and the condensate passes around the system again. The gas and uncondensed vapors pass to hot condenser K where heavy hydrocarbons are condensed into receiver L and pass back to reservoir G through M. The gas saturated with light hydrocarbon vapors, passes to condenser O, still under the pressure maintained in D and G, through line N where the main low boiling condensate is obtained in receiver P with outlet W. The gas before passing back into the gas mains is passed through line Q to absorber R where the last valuable portions of gasolene are removed by an absorbent menstruum entering at S and exiting at T. The oil drawn off at T may be treated in any suitable still to separate the absorbed gasolene from the absorbent menstruum. The denuded gas passes out through valve V and line U.

By means of the auxiliary condenser K the heavier hydrocarbons are knocked out of the gaseous mixture, into receiver L and the regulation of this condenser properly, permits of drawing off gasolene direct from the main condenser through tank P and line W, without redistillation.

When desired the gas from the outlet of the absorber can be returned by a suitable gas pump or compressor to the gas superheater in which case the gas regulator valve is preferably located on the outlet gas line of absorbers.

What we claim as new and desire to secure by Letters Patent, is;

1. That process in the art of distilling liquid residues of petroleum distillation having a boiling point of upward of 400° F. for the obtaining of low-boiling-point hydrocarbons, which consists in circulating the oil from and back to a bulk supply of the liquid; maintaining on the oil a pressure which prevents fractional distillation, not less than the pressure under which the vapors are condensed, by means of injected highly heated gas; continuing the cracking and starting distillation by causing highly heated gas to flow through the cracking zone, cooling the gases and vapors in an auxiliary condenser sufficient to condense oils less volatile than the desired product; further cooling the gas and vapors in the main condenser; absorbing the last traces of gasolene from the gas in an absorber by means of an absorption menstruum, as described.

2. That process in the art of distilling liquid residues of petroleum distillation having a boiling point of upward of 400° F. for the obtaining of low-boiling-point hydrocarbons, which consists in circulating the oil from and back to a bulk supply of the liquid; maintaining on the oil a pressure which prevents fractional distillation, equal to or greater than the pressure under which the vapors are condensed, by means of injected highly heated gas; continuing the cracking and starting distillation by causing highly heated gas to flow through cracking zone, passing the gases and vapors through an auxiliary condenser, bringing back to the bulk supply of the oil any liquid condensed by the auxiliary condenser; cooling the gas and vapors in the main condenser under a pressure about equal to the pressure on the oil during distillation; absorbing the last traces of gasolene from the gas in an absorber by means of an absorbent menstruum; removing from the system tarry matter from the bulk supply of the liquid by distillation while maintaining a constant amount of oil in the system by addition of new oil.

3. That process in the art of distilling petroleum residues having a boiling point of upward of 400° F. for the production of lower boiling point hydrocarbons, which consists in circulating the oil from and back to a bulk supply of the liquid while maintaining on the oil a pressure which prevents fractional distillation not substantially less than the pressure under which the vapors are condensed by means of highly heated gas; continuing the cracking and distillation by causing highly heated gas to flow through the cracking zone; passing the gases and vapors through an auxiliary condenser, bringing back to the bulk supply of the oil any liquid condensed by the auxiliary condenser, cooling the gas and vapor in the main condenser and absorbing the last traces of gasolene in any suitable absorber by the way of means of a suitable absorption menstruum.

4. The improvement in the art of cracking mineral oil having a boiling point above that of ordinary gasolene, which comprises maintaining a bulk of oil under superatmospheric pressure, passing oil from such bulk together with a highly heated gaseous fluid containing hydrocarbons, through a coil in which the oil is heated to a cracking temperature, while under superatmospheric pressure, thereafter passing the resulting product through a trap to remove non-vaporous material, then cooling the gases and vapors sufficiently, while under said pressure to separate products not sufficiently volatile for gasolene substitute, then further cooling such gases and vapors sufficiently to condense gasolene, all of said operations being conducted under superatmospheric pressure, and finally scrubbing the remaining gases with an absorbent for gasolene vapors.

In testimony whereof we affix our signatures.

P. McDONALD BIDDISON.
HUGH T. BOYD.